June 10, 1930.  D. L. ROSCOE  1,763,257
AEROFOIL
Filed April 25, 1928
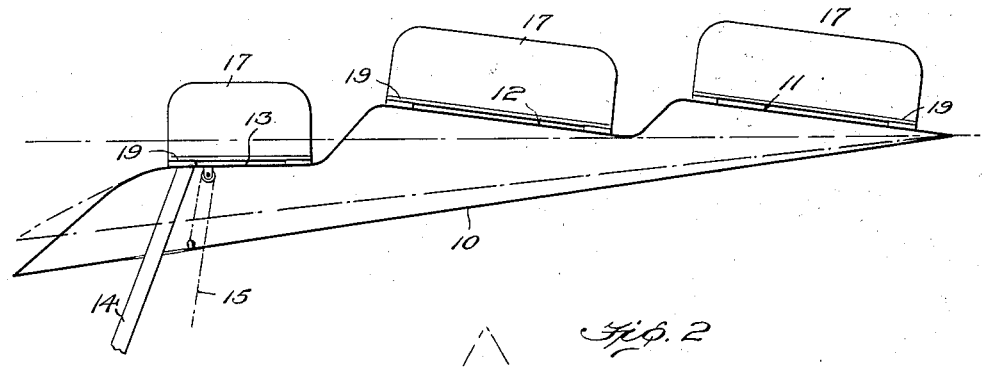
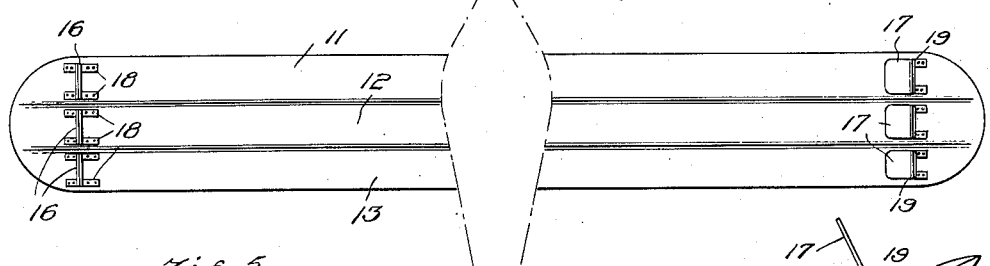
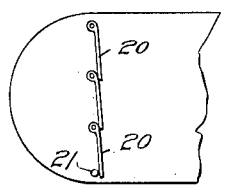
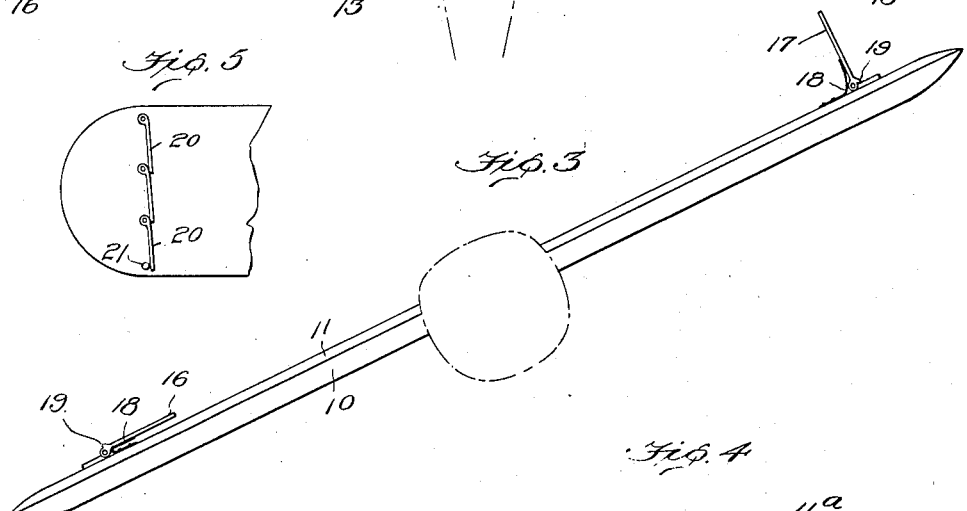
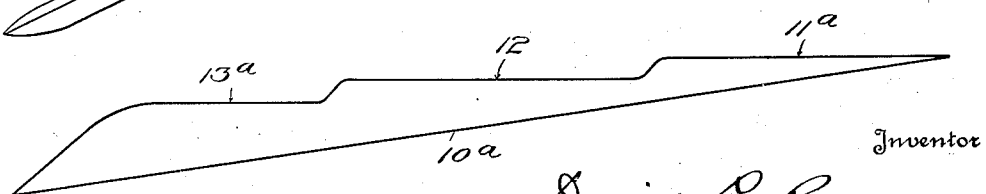
Inventor
David L. Roscoe
By
His Attorneys Patented June 10, 1930

1,763,257

UNITED STATES PATENT OFFICE

DAVID L. ROSCOE, OF SAN DIEGO, CALIFORNIA

AEROFOIL

Application filed April 25, 1928. Serial No. 272,806.

This invention relates to new and useful improvements in aeroplane wings and more particularly to an aeroplane wing with which the vacuum lift is considerably increased. It is a well known fact in the science of aviation that a greater degree of lifting force, for sustaining the plane in flight, is derived from the vacuum suction on the upper side or surface of the wing. This lift is believed to be somewhat in excess of seventy-five percent greater than the pressure on the lower surface of the wing in ordinary wing construction and the primary object of the present invention is to provide a wing wherein this lifting force or vacuum is increased to a point substantially double to that of the ordinary wing.

In the wing contemplated in the present instance it is preferred that the angle of incidence between both the upper and lower surfaces of the wing with respect to the line of flight, particularly at the forward edge of the wing, be substantially equal, whereby lifting forces exerted by air pressure on the under surface of the wing will substantially neutralize the air forces imposed on the upper surface of the wing. In the preferred form of wing this angle of incidence is equal only at the forward portion and to the rear of said forward portion a series of pockets or depressions are formed in the upper surface of the wing, thereby considerable increased lifting force, created by the vacuum, is obtained.

Other details of the invention consist in providing means for varying the angle of incidence of the upper and lower surfaces of the wing with respect to the line of flight. Another feature consists in the provision of stabilizing means for preventing side slipping of the plane.

With these and other objects in view, the present invention consists in certain novel details of construction and combinations and arrangements of parts, all as will be hereinafter more fully described and the novel features thereof particularly pointed out in the appended claims.

In the accompanying drawings,—

Figure 1 is a view taken transversely or from the front to the rear edge of an aeroplane wing constructed in accordance with the present invention, the illustration being more or less diagrammatical.

Fig. 2 is a top plan view of a pair of wings with one set of the stabilizing devices rendered inoperative and the other set shown in the position it occupies to prevent side slipping;

Fig. 3 is a front edge view of the wings illustrated in Fig. 2 with the positions of the two stabilizing devices reversed.

Fig. 4 is a view similar to Fig. 1 showing a cross section of a modified form of wing.

Fig. 5 is a detail of the wing tip.

In the preferred form of wing illustrated in Fig. 1, the entire bottom surface 10 of the wing and the forward portion 11 of the upper surface of the wing are disposed as substantially equal angles with respect to the line of flight, the imaginary line of flight being indicated by the dotted line. An angle of approximately ten degrees has been found to be satisfactory with this arrangement of the upper and lower surfaces of the wing, the head resistance or drag created by pressure of air against the upper surface of the wing and the resulting downward action caused by such head resistance, is substantially neutralized by the lifting force created by the head resistance against the under surface of the forward portion of the wing. This is not true of the ordinary aerofoil which is cambered at the leading edge of the wing.

To increase the lifting effect of the wing the upper surface of the latter, in rear of the forward portion 11, is formed with a series of depressions, the present wing being illustrated as having an intermediate depression 12 and a depression 13 at the rear thereof, the rear portion of this latter zone merging into the rear edge of the bottom surface 10 of the wing. As the vacuum created above the wing by these depressions becomes less effective from the forward to the rearward of the wing, the depression 12 is the primary lifting factor so far as the vacuum force is concerned, but the provision of the series of depressions naturally augments the lifting force created at the upper surface of the wing. The intermediate zone or depression 12 is also preferably formed with its surface disposed with respect to the line of flight at substantially the same angle as the forward portion 11 of the upper surface, although this is not true of the zone of depression 13, as the latter must merge into the bottom surface of the wing. With a wing constructed as thus described, there is practically no head resistance or drag and substantially no resulting downward reaction on the wing. In fact, substantially all forces generated tend to lift. The vacuums created at the upper surface of the wing tend to lift, of course, and the entire under surface 10 is so disposed with respect to the line of flight that all head resistance is transformed into lifting force.

In the modified form of the invention illustrated in Fig. 4, the forward portion 11$^a$ of the upper surface of the wing is disposed substantially parallel to the contemplated line of flight and immediately in rear of said forward portion 11$^a$ the zone 12$^a$, for creating the vacuum, also has its surface disposed parallel to the line of flight. At the rear edge of the supper surface of the wing a second depression 13$^a$ is formed and the entire under surface 10$^a$ is so disposed with respect to the line of flight that the entire head resistance created thereby is transformed into lifting force.

It is proper that each form of wing illustrated in Figs. 1 to 4 be provided with means for varying the angle of incidence, although such means have been shown in Fig. 1 only. These means, for instance, may consist of a strut 14 extending through the under surface of the wing, the upper extremity of the strut having pivotally attached thereto a portion of the frame of the wing. A pulley cord 15, attached to the wing and extending to the pilot's controls, is provided for varying the angularity of the wing on the strut as shown in dotted lines in Fig. 1. Adjustability of the wing in this respect is advantageous, because, when the load on the plane lightens, the angle of incidence may be reduced, thereby increasing the cruising radius of the plane. The larger the angle of incidence of the lower surface up to a certain point, the greater the lifting effect of the wing and the less the spread. On the contrary, as the angle of incidence is decreased the speed of the plane is increased. In a long flight, as fuel is used, this angle of incidence may be reduced so that the ship is immediately capable of picking up in speed, and, of course, the cruising radius thereof greatly increased.

For the purpose of stabilizing a plane equipped with the present wing, the two wings are provided at their outer ends or tips with vanes 16, 17, normally positioned substantially perpendicular with respect to the upper surface of the wing. These vanes extend longitudinally of the line of flight and might be likened to the dorsal fin on the back of a fish. The purpose of such vanes is to prevent side slipping of the ship, or, expressed differently, to maintain it on an even keel. Each vane 16, 17, is pivotally mounted on the upper surface of the wing and is normally maintained in its perpendicular position by suitable yielding means such as springs 19. Stops 20 limit the turning movement of the vanes toward their respective ends while, on the other hand, each vane is capable of collapsing or folding inwardly, so to speak, against the tension or pressure of the spring. With this arrangement, vane 16 can fold or collapse to the right but not to the left, while vane 17 can fold to the left, but not to the right. Therefore, if side slipping to the left should tend to take place, the pressure of air on vane 16 causes it to collapse or fold down, but vane 17 remains erect and rigid so that by air impinging on the left side of vane 17, the right wing is pushed downward and the plane 10 is returned to an even keel. If the tendency is for the ship to turn to the right, the reverse action takes place, i. e., vane 16 remains erect while the pressure on vane 17 causes it to fold down or collapse to the left. Upon return of the ship to an even keel the vanes are both restored to their normal perpendicular positions by the springs 18.

What I claim is:

1. An aeroplane wing having the forward portions of its upper and lower surfaces converging forwardly to form a thin edge at the wing front, whereby head resistance is substantially eliminated, and said upper surface having a depression therein spaced rearwardly from said edge thereby producing a vacuum above the wing during flight of the plane the surface of said depression and the upper surface of the wing in advance of said depression being parallel to the line of flight of the plane.

2. An aeroplane wing having the forward portions of its upper and lower surfaces converging forwardly to form a thin edge at the wing front whereby head resistance is substantially eliminated, and said upper surface having a depression extending along the rear portion of the wing and merging into the bottom surface of said wing, the surface of said depression and of the forward portion of the upper surface of the wing being parallel to the line of flight of the plane.

3. An aeroplane wing having the forward portions of its upper and lower surfaces converging forwardly to form a thin edge at the wing front whereby head resistance is substantially eliminated, and said upper surface having a series of depressions therein located between the rear edge of the wing and said forward portion, one of said depressions extending to the rear edge of the wing and the surfaces of said depressions being parallel to the line of flight of the plane.

4. An aeroplane wing having the forward portions of its upper and lower surfaces converging forwardly to form a thin edge at the wing front, the angle of incidence of said forward portions with respect to the line of flight being substantially equal, whereby head resistance is substantially eliminated, and said upper surface having a depression therein, thereby producing a vacuum above the wing during flight of the plane the surface of said depression being parallel to the line of flight of the plane.

5. An aeroplane wing having the forward portions of its upper and lower surfaces converging forwardly to form a thin leading edge, the angle of incidence of said converging portions with respect to the line of flight being substantially equal, and said upper surface having a depression therein extending along the rear edge thereof the upper surface of the forward portion of said wing and the surface of said depression being parallel to the line of flight of the plane.

6. An aeroplane wing having the forward portions of its upper and lower surfaces converging forwardly to form a thin leading edge, the angle of incidence of said converging portions with respect to the line of flight being substantially equal, and said upper surface having a series of depressions therein at the rear of said forward portion, one of said depressions merging into the bottom surface of the wing at the rear edge of the latter the upper surface of the forward converging portion of the plane and the surface of at least one of said depressions being parallel to the line of flight of the plane.

7. An aeroplane wing having the forward portions of its upper and lower surfaces converging forwardly to form a thin leading edge, the forward portion of said upper surface being parallel to the line of flight of the plane and the angle of incidence of said converging portions with respect to the line of flight being substantially equal, said upper surface having a depression therein at the rear of said forward portion, and means for varying said angle of incidence.

8. An aeroplane wing having upper and lower surfaces, said upper surface of said wing being divided into a series of zones extending from the front toward the rear edge of the wing with the surface of each zone parallel to the line of flight of the plane, the forward boundaries of each zone lying nearer the lower surface of the wing than the rear edge of the next adjacent forward zone, whereby a series of depressions is formed in said upper surface.

9. An aeroplane wing having upper and lower surfaces, said upper surface of said wing being divided into a series of zones extending from the front toward the rear edge of the wing, the forward boundaries of each zone lying nearer the lower surface of the wing than the rear edge of the next adjacent forward zone, whereby a series of depressions is formed in said upper surface, and the lower surface of the wing and that of said forward zone of the upper surface converging forwardly to form a thin leading edge on said wing with the surface of said forward zone of the upper surface of the wing disposed parallel to the line of flight.

DAVID L. ROSCOE.